June 13, 1967 S. D. WEAVER 3,325,174
PIPE JOINT PACKING

Filed Nov. 16, 1964 3 Sheets-Sheet 1

INVENTOR
SIMEON D. WEAVER

BY *Raphael Semmes*

ATTORNEY

June 13, 1967 S. D. WEAVER 3,325,174
PIPE JOINT PACKING

Filed Nov. 16, 1964 3 Sheets-Sheet 2

INVENTOR
SIMEON D. WEAVER
BY Raphael Semmes
ATTORNEY

June 13, 1967 S. D. WEAVER 3,325,174
PIPE JOINT PACKING

Filed Nov. 16, 1964

INVENTOR
SIMEON D. WEAVER
BY Raphael Semmes
ATTORNEY

United States Patent Office 3,325,174
Patented June 13, 1967

3,325,174
PIPE JOINT PACKING
Simeon D. Weaver, Birmingham, Ala., assignor to Woodward Iron Company, Woodward, Ala., a corporation of Delaware
Filed Nov. 16, 1964, Ser. No. 412,882
5 Claims. (Cl. 277—168)

This invention relates to packing joints for use in conventional hub and spigot-type pipe sections originally designed to be sealed by the use of lead and oakum caulking, the present application being a continuation-in-part of my copending application Ser. No. 188,087, filed Apr. 17, 1962. More particularly, the invention consists in new and useful improvements in a rubber, neoprene or other suitable elastomer gasket designed for insertion in the hub portion of one pipe section to be radially compressed therein by insertion of the spigot portion of an adjacent pipe section, the gasket of the present invention representing an improvement on the packing joint shown and described in U.S. Patent No. 2,953,399, issued to the present applicant and Albert A. Hollingsworth on Sept. 20, 1960.

An object of the invention is to provide a packing joint of this general character, including an annular gasket of rubber or other elastic compressible material and having coacting dual sealing portions operable in two longitudinally spaced areas of radial compression, each of said sealing portions embodying structural shapes designed to prevent the gasket from displacement during the insertion of the spigot section into the hub section, while at the same time allowing the gasket to roll only enough for the end of the spigot to be inserted easily without damage to the gasket.

Another object of the invention is to provide a dual sealing gasket having a radial restraining flange arranged to contact the outer face of the hub to hold the gasket in position and allow limited rolling during compression while inserting the spigot section, a centering throat or cone being provided in conjunction with said flange to insure center mating of the spigot during assembly of the joint.

Still another object of the invention is to provide a gasket having two axially spaced sealing portions integrally connected by an intermediate section of reduced thickness, arranged to space the sealing sections properly to afford axial stability to the joint, and, at the same time, serve as a tension member to restrain the second sealing section and allow limited rolling while compressing the gasket during assembly.

Heretofore, all gaskets have been designed specifically for one size and one class of pipe, such, for example, as either four-inch service weight or four-inch extra heavy weight soil pipe, and, furthermore, none of the specially designed gaskets conventionally used are suitable for a standard hub designed in accordance with commercial standard 188 specification. It is, therefore, a further object of this invention to provide a seal which will be effective under all dimensional tolerances of CS 188 specification for a given size in either the service weight or extra heavy weight classes.

A still further object of the invention is to provide a gasket which, in addition to being effective when used with either the service weight or extra heavy weight pipes, also affords excellent resistance against separation of the joint under pressure, due to the rolled and compressed action of the sealing portions of the gasket against complementary mating pieces, even when the hub inside diameter is maximum and the mating plain end or inner piece is of a minimum outside diameter.

Another object is to provide a gasket affording two positive seals against leaks, one at each sealing portion, even under conditions of offset loading, such as would be encountered by truck traffic load over the mating internal piece applied near the assembled joint.

Still another object of the invention is to provide a universal type seal which will eliminate the need for two different size seals which are now required for different classes of pipe, with the resultant possibilities of faulty assembly and the use of the wrong components.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views.

Figure 7:
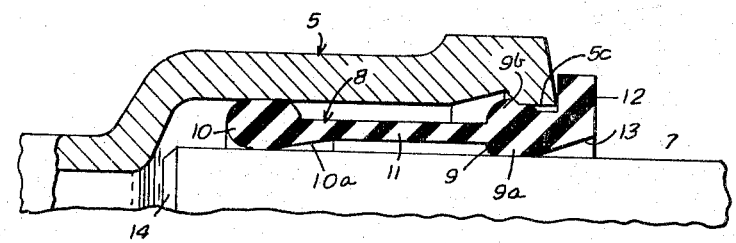
FIG. 7 is a similar view showing the joint in assembled condition.
Figure 9:
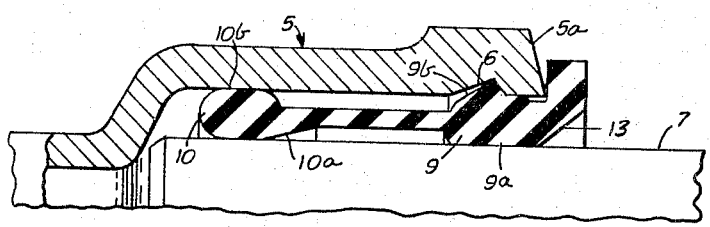
Figure 12:
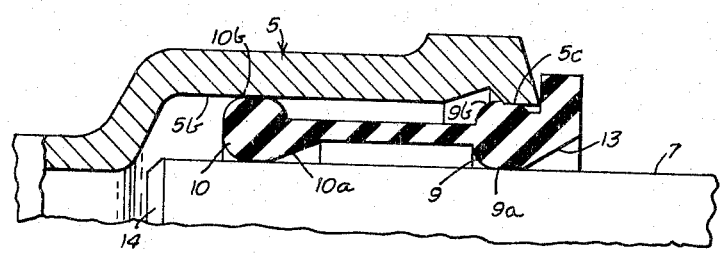
Figure 13:
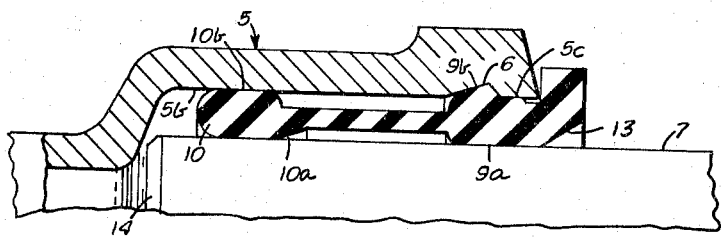

FIG. 12 illustrates a completed extra heavy class assembly with a maximum bell and a minimum spigot size comparable to the tolerances of the service weight assembly of FIG. 7; and FIG. 13 illustrates the extra heavy completed assembly using the minimum extra heavy bell inside diameter and the maximum extra heavy spigot outside diameter which is comparable to and has the same tolerances as shown in FIG. 9.

Figure 1:
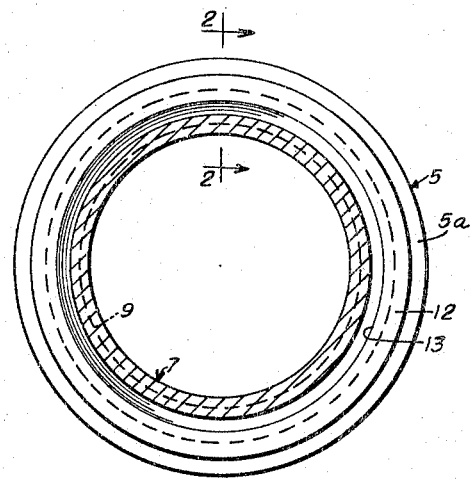
FIG. 1 is a transverse sectional view of the pipe joint comprising the present invention, showing the spigot in section and the end face of the hub and gasket in full lines.
Figure 2:
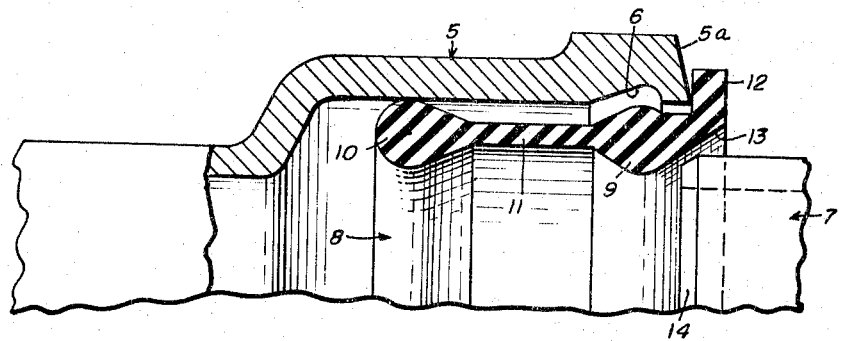
FIG. 2 is an enlarged sectional view taken on line 2—2 of FIG. 1 and showing the hub, gasket and spigot in the course of assembly.
Figure 3:
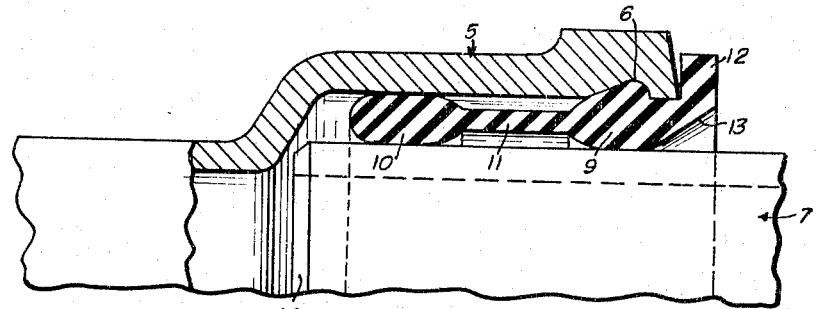
FIG. 3 is a similar view showing the pipe sections and gasket assembled in a sealed joint.
Figure 4:
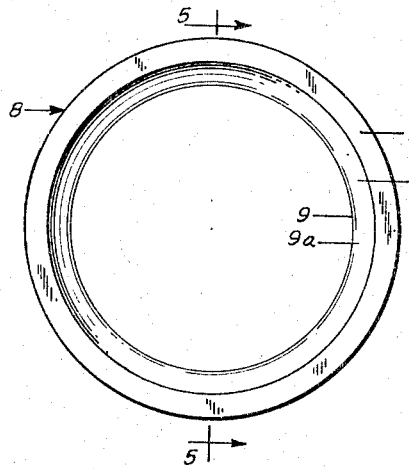
FIG. 4 is an end view of one of the gaskets of the invention.
Figure 5:
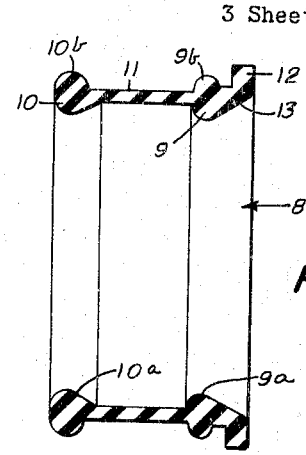
FIG. 5 is a sectional view through the gasket taken on line 5—5 of FIG. 4.

In the drawings, referring first to FIGS. 1 to 3 which illustrate the basic structure of the invention, 5 represents the bell or hub of a pipe section of conventional form, normally designed to be sealed by forcing lead and oakum caulking between two sections and in the annular groove 6 in the inner periphery of the hub adjacent the opening through which the spigot section 7 is inserted. The gasket, generally represented by the numeral 8, comprises an annular ring composed of rubber, neoprene, or other elastic compressible material, and is provided with two axially spaced tori 9 and 10, integrally and coaxially connected by a center section 11 of reduced thickness and located in the cross-sectional center of both tori 9 and 10. As will later appear, the tori 9 and 10 coact as dual sealing portions adapted to be compressed at spaced points between the inner periphery of the hub 5 and the outer periphery of the spigot 7.

Integral with the outer end of the first torus 9 is a radial positioning flange 12 arranged for abutment with the outer face 5a of the hub 5 and terminating at its inner boundary in an inwardly and axially converging throat 13 contiguous with the torus 9, which serves as a centering cone for the entering end of the spigot 7. Preferably, the leading edge of the spigot member 7 is tapered as at 14 to facilitate its insertion in the gasket.

As will be seen from FIG. 2, the smooth rounded protuberances of the sealing portions 9 and 10 are formed with an outer diameter to permit the gasket to be easily inserted within the hub 5 with a sliding fit and with an inner diameter normally less than the outer diameter of the spigot 7. The throat or cone 13 which is contiguous with the sealing portion 9 has a sufficient flare to easily receive the spigot 7 and align it for engagement within the sealing portion 9.

In the assembly of the joint, the gasket 8 is first inserted in the hub 5 with its restraining flange 12 in abutment with the outer face 5a of the hub in the position shown in FIG. 2. Here, it will be seen that while the outer periphery of sealing portion 10 is slidably engaging the inner periphery of the hub 5, the outer periphery of the sealing portion 9 is aligned with but spaced inwardly from the groove 6. The spigot end 7 is then preferably lubricated to facilitate insertion, and, thereafter, inserted in the centering cone or throat 13. The spigot engages the first sealing portion 9 and as it is forced longitudinally therethrough, said sealing portion or torus 9 is caused to undergo a limited rolling movement into the groove 6. The spigot then continues and passes through the sealing portion 10 which also undergoes a limited rolling, and, in the course of this insertion, these sealing portions are both subjected to a uniform rolling and squeezing action between the outer periphery of the spigot and inner wall of the hub with portion 9 compressed in groove 6, as shown in FIG. 3. As previously stated, the sealing portions 9 and 10 are spaced to provide axial stability to the joint, and the center section 11 acts as a tension member to restrain the sealing portion 10 during assembly yet allow limited rolling. Also, the central location of the connecting section 11 allows a uniform rolling and squeezing action and evenness of flow of both sealing portions to effect a stable seal with the seal loadings under straight compression.

As heretofore indicated, the present invention is an improvement in that shown in Patent No. 2,953,399, and the connected dual sealing portions 9 and 10 are designed to retain the limited rolling features disclosed in said former patent. In other words, upon the insertion of the spigot section in the hub section, the gasket is preloaded by a mechanical squeeze on the opposed pressure-receiving surfaces, and the sealing portions 9 and 10, under the stabilizing effect of the central connecting section 11, undergo a limited rolling motion to facilitate the entry of the end of the spigot section and are thereafter compressed radially and extended fore and aft into sealing contact between the spigot section and the hub section and within the confines of the groove 6.

It will be apparent that the gasket 8 and the dimensions of the dual seal portions are such as to seal with a wide variation of dimensional tolerances in both diameters and depths of the hub 5 and diameters of the spigot 7, such as would be encountered, but not limited to, current soil pipe specifications. The actual seal is effected at both sealing portions 9 and 10, by the compression of the sealing portions between the outside diameter of the spigot 7 and the inside diameter of the hub 5 in a continuous radial path in these two areas.

Thus, the gasket of the present invention, as indicated earlier, is universally adaptable for sealing joints between pipe sections in either the service weight or extra heavy weight classes without the necessity of using different seals for different pipe classes. For example, referring to FIG. 6 which embodies a service weight soil pipe joint of maximum bell inside diameter and minimum spigot outside diameter, when the gasket 8 is inserted in the bell 5, the restraining flange 12 contacts the face 5a of the bell to restrain the gasket during assembly of either service weight or extra heavy weight pipe. The surface 13 of the gasket is at approximately 45° and terminates in a half torus 9a radially opposite the half torus 9b which is in a fixed relation to the backside of flange 12 of the gasket. The relation between half torus 9b and the backside of the flange 12 is such that upon insertion of pipe 7 into the hub 5, half torus 9b lies against or opposite the first straight portion 5c of the bell by at least 50% of the longitudinal thickness of that portion of torus 9. Upon assembly, as seen in FIG. 7, a seal is effected between the outer periphery of the spigot 7 and surface 5c of the inside of the bell by compressing the torus 9 of the gasket with some portion of said torus rolling into the lead groove 6, sealing that portion of the groove also. The converging surface 10a of the second torus 10 of the gasket acts as a centering cone for the end of spigot 7 and also coacts with the connecting section 11 as a restraining member to limit the rolling movement of torus 10 during assembly.

In FIG. 7, the pushing of the spigot 7 into mating position causes the gasket torus 9 to roll slightly and flow into the groove 6, only partially filling the available space in said groove. The pipe, upon contact of surface 10a of torus 10, restrains the cross-section 10 and allows only limited rolling so that torus 10 is essentially in straight compression for the seal required under the maximum joint space conditions with the least compression of the gasket between the surfaces 5c and 5b of the inside of the bell and surface 7 of the outside of the spigot.

Figure 8:
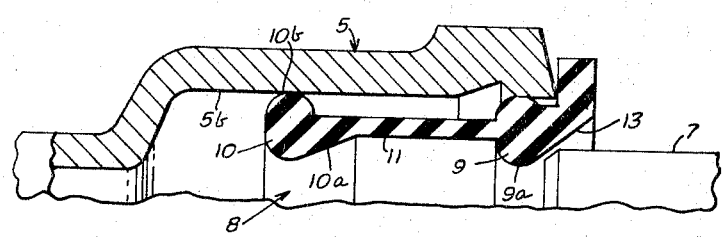
FIGS. 8 and 9 are views similar to FIGS. 6 and 7 respectively, but illustrating the use of the invention with minimum bell inside diameter and maximum spigot outside diameter, and illustrating the maximum amount of gasket compression.

Turning now to FIGS. 8 and 9 which illustrate the same conditions as just described, but with minimum bell inside diameters and maximum spigot outside diameters, there is a maximum amount of gasket compression in FIG. 9 which rolls more of the torus 9 into the groove 6, almost completely filling the latter. Because of the tighter fit with higher compressive forces involved, the torus 10 does slightly more rolling than in FIG. 7 to accommodate the closer mating fits of the inside surfaces 5b and 5c of the bell and the outer periphery of the spigot 7.

Figure 6:
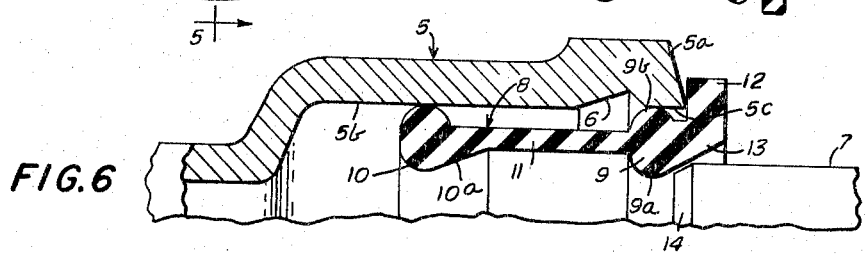
FIG. 6 is a fragmentary sectional view illustrating the pipe joint in the course of assembly, using a service weight soil pipe of maximum bell inside diameter and minimum spigot outside diameter.
Figure 10:
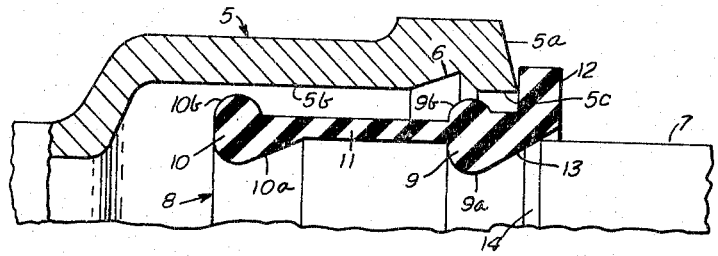
FIG. 10 shows the gasket of the invention being inserted in an extra heavy bell.
Figure 11:
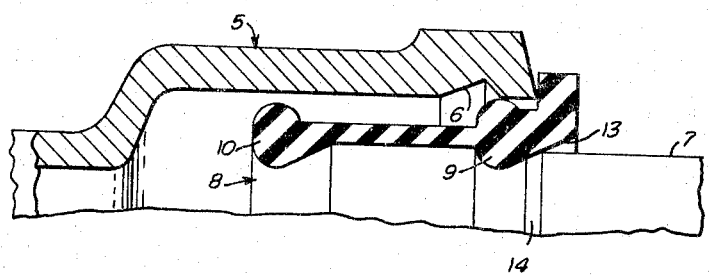
FIG. 11 is a similar view showing the spigot partially inserted in the bell.

In FIG. 10, the gasket 8 is shown in the course of being inserted in an extra heavy bell 5 with the inner surface of gasket flange 12 contacting the end face 5a of the hub, but with half tori 9b and 10b of tori 9 and 10 respectively out of contact with the inner surfaces 5b and 5c of the inside of the bell. The beveled end 14 of the spigot 7 lies against the angular surface 13 of the gasket, and upon the start of the assembly as shown in FIG. 11, the beveled end 14 of the spigot 7 being forced against the converging surface 13 of the gasket radially expands the entire flange 12 of the gasket until the half torus 9b contacts surface 5c of the inside of the bell. Thus, at this point, the components of the extra heavy assembly are in the same relation as shown in FIG. 6 for the service weight assemblies. Upon complete assembly of the components, the first sealing portion or torus 9 assumes the same sealing conditions as described in the service weight assemblies, and as the spigot 7 contacts the surface 10a of the second torus 10 of the gasket, further movement of the spigot 7 radially expands the torus 10 until the half torus 10b contacts the inside 5b of the bell.

FIG. 12 illustrates the completed extra heavy class assembly which is of a maximum bell and a minimum spigot size comparable to the tolerances of the service weight assembly shown in FIG. 7.

FIG. 13 shows the extra heavy completed assembly using the minimum extra heavy bell inside diameter and the maximum extra heavy spigot outside diameter which is comparable to the completed assembly of the service weight units and with the same tolerances as shown in the assembly of FIG. 9.

It will thus be seen that the present invention provides a gasket which will seal pipe components of substantially different diameter such as found in CS 188 for either service weight or extra heavy weight soil pipe of the same nominal diameter, using only one gasket for either weight classification. During assembly of the gasket into the service weight pipe hub, the outer sealing portions of tori 9 and 10 are compressed slightly upon insertion of the gasket; then, upon insertion of the spigot, the sealing portions roll slightly and flow as shown in the drawings.

However, during assembly of the gasket into an extra heavy outer bell, the outside sealing portions of tori 9 and 10 do not contact the inner surface 5c of the bell; but, upon insertion of the spigot, the entire sealing portion or torus 9 is expanded and then compressed between the inner surface 5c of the bell and the outer periphery of the spigot 7. The flange 12, being of a thicker cross-section and buttress-shaped as at 13 in attachment to the main portion of the gasket, readily holds the gasket against the forces of the spigot during stretching and enlarging to accommodate the spigot while being forced into the assembly. The second torus 10 performs in assembly in the same manner as the torus 9, and both sealing portions are then under rolling compression and flow as in the assembly of the service weight components. Manifestly, in the assembled joint, a positive seal is afforded under all conditions at the sealing tori 9 and 10.

The following tables illustrate the wide tolerances of dimensions of soil pipe and are typical of seal conditions using the gasket of the present invention:

TABLE I.—MAXIMUM AND MINIMUM DIMENSIONS OF SEALING SURFACES AND GASKET SPACE OF 4" SERVICE WEIGHT AND EXTRA HEAVY WEIGHT SOIL PIPE

|  | Hub I.D. Max. | Spigot O.D. Min. | Diff. | Gasket Space | Cross-Section of Gasket |
|---|---|---|---|---|---|
| Service Weight | 5.03 | 4.16 | .87 | .435 | .500 |
| Extra Heavy Weight | 5.28 | 4.41 | .87 | .435 | .500 |

TABLE II

|  | Hub I.D. Min. | Spigot O.D. Max. | Diff. | Gasket Space | Cross-Section of Gasket |
|---|---|---|---|---|---|
| Service Weight | 4.88 | 4.34 | .54 | .27 | .500 |
| Extra Heavy Weight | 5.13 | 4.59 | .54 | .27 | .500 |

The above tables point out the wide variation of gasket space in relation to gasket cross-section.

In order to verify the fact that the same gasket will effect a seal on either the service weight or the extra heavy class of pipe in any one size group and to determine the sealing qualities of two-inch, three-inch, and four-inch joints embodying the gasket of the present invention, a series of tests were conducted by Pittsburgh testing laboratory, a nationally recognized testing laboratory, and the report of such tests clearly confirm the advantageous results and the universal adaptability of the gasket as set out above. A copy of this formal report will be made available for the file of this application if required.

From the foregoing, it is believed that the invention may be readily understood by those skilled in the art without further description, it being borne in mind that numerous changes may be made in the details disclosed without departing from the spirit of the invention as set forth in the following claims.

I claim:

1. In a pipe packing joint including a spigot section and a conventional spigot receiving hub section of the type having an annular packing groove on its inner periphery; an annular gasket of elastic compressible material insertable in said hub, said gasket comprising coaxial inner and outer sealing tori longitudinally spaced and integrally connected at their cross-sectional centers by an annular section of reduced thickness which is radially spaced inwardly with respect to the inner and outer radial boundaries of respective tori to thereby lie in radially spaced relation to the adjacent peripheries of said spigot and hub, said tori having a normal uncompressed inner diameter less than the outer diameter of said spigot and a normal uncompressed outer diameter to be insertable within said hub section, the outer periphery of said outer torus being of a diameter which, when uncompressed, normally lies adjacent but out of contact with said groove, and the outer axial extremity of said outer torus carrying an integral, radially enlarged hub-abutment flange, the inner radial boundary of said flange and the adjoining area of said outer torus being contoured to form an annular converging spigot-centering throat, whereby, upon engagement by said spigot section, said tori are preloaded with a mechanical squeeze with a limited rolling action and are successively compressed between the outer periphery of said spigot section and the inner periphery of said hub section, with said outer torus at least partially filling said groove.

2. A gasket as claimed in claim 1, wherein said inner torus is provided with a converging spigot-centering throat aligned with said first-named throat.

3. A gasket as claimed in claim 1, wherein the inside diameter and outside diameter of the gasket are such as to accommodate a joint having a hub inside diameter equal to the outside diameter of the tori of said gasket, and wherein the mating spigot section has an outside diameter less than the inside diameter of said hub by 50% to 75% of the difference between the inside diameter and outside diameter of the gasket.

4. A gasket as claimed in claim 3, wherein the outside diameters of the tori of said gasket are less than the inside diameter of said hub by 0–30% of the difference between the inside diameter and the outside diameter of said gasket.

5. An annular gasket adaptable for use in sealing conventional hub and spigot pipe joints respectively having varying hub inner diameters and spigot outer diameters and of the type wherein said hub is provided with a packing groove; said gasket being formed of elastic compressible material and being provided with coaxial inner and outer sealing tori, longitudinally spaced and integrally connected at their cross-sectional centers by an annular section of reduced thickness which is radially spaced inwardly with respect to the inner and outer radial boundaries of respective tori and correspondingly spaced from the adjacent peripheries of said spigot and hub, the outer axial extremity of said outer torus carrying an integral radial flange of an outer diameter greater than the inner diameter of said hub and with an inwardly converging spigot-centering throat bounding its inner periphery, the outer diameters of said tori being such with respect to the inner diameter of said hub as to permit insertion thereof into the latter from its open end, with said flange in abutment with the end of the hub, said outer torus being spaced inwardly in an axial direction from said flange a distance to normally at least partially underlie said groove, substantially out of contact therewith when in uncompressed condition, and the inner diameters of said tori when in normal uncompressed condition being less than the outer diameter of said spigot, whereby upon insertion of said spigot in said hub with said gasket in place therein, said tori are preloaded with a mechanical squeeze with a limited rolling action and are successively compressed between the outer periphery of said spigot and the inner periphery of said hub, with said outer torus rolled into and at least partially filling said groove.

References Cited

UNITED STATES PATENTS

| | | |
|---|---|---|
| 2,116,705 | 5/1938 | Marx et al. |
| 2,953,398 | 9/1960 | Haugen et al. ____ 277—227 X |
| 3,041,077 | 6/1962 | Osterloh et al. ____ 277—209 X |
| 3,081,102 | 3/1963 | Murray et al. _____ 277—168 |

FOREIGN PATENTS 1,348,390  12/1963  France.

SAMUEL ROTHBERG, *Primary Examiner.*